Patented Sept. 6, 1949

2,481,155

UNITED STATES PATENT OFFICE 2,481,155

RESINOUS COMPOSITIONS

Frederic C. Schaefer, Stamford, Conn., assignor to American Cyanamid Company, New York, N. Y., a corporation of Maine No Drawing. Application December 20, 1946, Serial No. 717,605

21 Claims. (Cl. 260—67.6)

This invention relates to the production of new synthetic materials and more particularly to new resinous compositions which are especially suitable for use in the plastics and coating arts. The invention specifically is concerned with compositions comprising a resinous material obtained by effecting reaction between ingredients comprising (1) an aldehyde (including polymeric aldehydes, hydroxyaldehydes and aldehyde-addition products) and (2) a thermoplastic composition, more particularly a linear polymer, resulting from a transesterification reaction between ingredients including (a) at least one triazine derivative represented by the general formula I 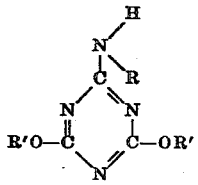

where R represents a member of the class consisting of hydrogen and monovalent hydrocarbon radicals and R' represents a monovalent hydrocarbon radical (e. g., 2-amino-4,6-dimethoxy-1,3,5-triazine, 2-amino-4,6-dialloxy-1,3,5-triazine, 2-cyclohexylamino - 4,6-dimethoxy-1,3,5-triazine, etc.) and (b) a dihydric alcohol in which the hydroxy groups are members of the class consisting of primary and secondary hydroxy groups (e. g., ethylene glycol, diethylene glycol, propylene glycol, dipropylene glycol, etc.), and further characterized by being a member of the class consisting of hydrocarbon dihydric alcohols and dihydric alcohols having an oxygen atom of a linear ether in a hydrocarbon chain and which are free from epoxy groups. The present invention also includes within its scope compositions comprising a resinous material obtained by effecting reaction between ingredients comprising (1) an aldehyde (including polymeric aldehydes, hydroxyaldehydes and aldehyde-addition products) and (2) a thermoplastic composition, more particularly a linear polymer, resulting from a transesterification reaction between (a) a plurality of triazine derivatives one of which corresponds to Formula I and another of which is represented by the general formula II 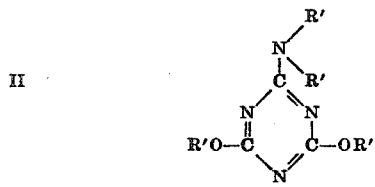

where R' represents a monovalent hydrocarbon radical and (b) a dihydric alcohol in which the hydroxy groups are members of the class consisting of primary and secondary hydroxy groups.

Illustrative examples of monovalent hydrocarbon radicals which R(Formula I) and R' (Formulas I and II) may represent are aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, tolylethyl, phenylpropyl, etc.).

The aldehyde-reactable thermoplastic compositions, more particularly aldehyde-reactable linear polymers, used in practicing the presnt invention are more fully described and claimed in my copending application Serial No. 717,606, filed concurrently herewith.

It is an object of the present invention to prepare a new class of synthetic materials, more particularly resinous compositions, which have particular utility in the plastics and coating arts, e. g., as coating, laminating, adhesive, impregnating, casting and molding compositions, as well as in other applications. Other objects of the invention will be apparent to those skilled in the art as the description of the invention proceeds.

The present invention is based on my discovery that new and valuable materials for use in coating, molding, and other applications can be prepared by effecting reaction between ingredients comprising an aldehyde, including polymeric aldehydes, hydroxyaldehydes and aldehyde-addition products (e. g., formaldehyde, paraformaldehyde, aldol, dimethylol urea, trimethylol melamine, etc.), and a thermoplastic composition, more particularly a linear polymer, of the kind described briefly in the first paragraph of this specification and more fully in my aforementioned copending application. Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins that have unsatisfactory plasticity or flow characteristics. The thermosetting or potentially thermosetting resinous condensation products, alone or mixed with fillers, pigments, dyes, plasticizers, lubricants, curing agents, etc., may be used, for example, in the production of molding compositions. The liquid intermediate condensation products of this invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

The thermosetting or potentially thermosetting resins of this invention have considerable toughness in thermoset or cured state, and in surface coatings give flexible films. This is due to the relatively large spacing along the ammelide ether chain between cross links, as compared with conventional amidogen-aldehyde resins. These spacings can be varied widely by the use of dihydric alcohols of different chain lengths in preparing the linear polymer, as well as by using a mixture of a triazine derivative containing an unreactive amino group and one containing a reactive amino group. These new resins are characterized by their good color stability on aging or under heat, in which respect they are markedly superior to resins prepared from the corresponding sulfur analogues which discolor under the same conditions. They therefore may be used advantageously in applications where color permanence is important. Because of their excellent electrical properties, e. g., high resistance to arcing, they also are particularly suitable for use in various electrically insulating applications.

The aldehyde-reactable thermoplastic compositions, more particularly aldehyde-reactable linear polymers, which are used in practicing my invention are prepared by effecting a transesterification reaction between ingredients including (1) a triazine derivative of the kind embraced by Formula I, or a mixture of such triazine derivatives, or a mixture containing such a triazine derivative and a triazine derivative of the kind covered by Formula II and (2) a polyhydric alcohol, more particularly a dihydric alcohol, in which the hydroxy groups are either all primary or all secondary or some primary and some secondary, or a mixture of such alcohols. Side reactions can be avoided substantially completely or reduced to a minimum by carrying out the transesterification reaction at a temperature not exceeding about 155° C., and preferably below 150° C. during all or most of the reaction period. The reaction between the triazine derivative and the dihydric alcohol ordinarily is carried out with the aid of a catalyst, the kind and amount of catalyst being so chosen that the reaction will proceed in the desired direction with a minimum formation of undesired by-products. As catalysts for the transesterification reaction, I prefer to use a member of the class consisting of alkali metals, more particularly sodium, potassium, lithium, rubidium or caesium (or mixtures thereof), and alcoholates of alkali metals (or mixtures thereof). The catalyst may be employed in the form of a mixture of an alkali metal and an alcoholate of such a metal. If the catalyst is not initially in the form of an alkali-metal alkoxide or alcoholate, the latter is formed when the alkali metal is dissolved in the dihydric alcohol reactant.

The amount of catalyst may be varied over a wide range depending, for example, upon the particular triazine derivative and dihydric alcohol employed and the particular properties desired in the finished product. Ordinarily, however, the catalyst is used in an amount, calculated as alkali metal, e. g., sodium, corresponding to at least about 1.5 mol per cent, preferably from about 2 to 10 or 12 mol per cent, of the molar amount of the triazine derivative employed. The use of higher percentages of catalyst is not precluded, but no particular advantage ordinarily accrues therefrom. Optimum results have been obtained when the amount of catalyst, calculated as alkali metal, was from about 4 to about 8 mol per cent of the molar amount of the triazine derivative used.

The proportions of the triazine derivative and the dihydric alcohol may be considerably varied, e. g., from approximately equimolecular proportions of each reactant to from 2 or 3 mols of the dihydric alcohol per mol of the triazine derivative. I prefer to use the dihydric alcohol and triazine derivative in approximately equal molar proportions.

The reaction between the triazine derivative and the dihydric alcohol may be effected in the presence or absence of an inert solvent, that is, a solvent which is inert during the reaction, e. g., benzene, toluene, xylene, dioxane, anisole, etc. If an inert solvent or a substantial molecular excess of dihydric alcohol be employed, the reaction may be carried out at atmospheric pressure. If an inert solvent or a substantial molecular excess of dihydric alcohol be not employed, then the reaction advantageously is conducted in large part under reduced pressure, e. g., from 750 mm. down to 0.5 mm. pressure, the lower pressures being employed at least toward the end of the reaction period. The pressure may be adjusted as desired or as conditions may require in order to effect the reaction without substantial decomposition of the reactants and to remove, e. g., by distillation, the volatile matter, more particularly the by-product alcohol, from the reaction vessel as transesterification between the reactants proceeds.

In most cases the reaction between the triazine derivative and the dihydric alcohol starts at about 70° or 80° C. and usually about 50% of the by-product alcohol, which is indicative of the extent of the reaction, is removed at a temperature around 100° to 130° C. Ordinarily the aldehyde-reactable thermoplastic composition is obtained by heating the reaction mass, advantageously under reduced pressure, at a final temperature of approximately 140° to 155° C., preferably at about 140° to 150° C., until no more alcohol is evolved. The total time of reaction will vary considerably depending, for example, upon the size of the batch, the particular reactants employed and other influencing factors. Ordinarily, however, the transesterification reaction to obtain linear polymers is completed by heating the mixed reactants in the presence of the catalyst under reduced pressure at from about 70° to about 155° C. for about ½ to 5 or 6 hours.

In some cases it may be desirable, in preparing the aldehyde-reactable thermoplastic reactant, to use a mixture containing a triazine derivative of the kind embraced by Formula I and a triazine derivative of the kind covered by Formula II. In this way, and as is shown by some of the examples given in my aforementioned copending application Serial No. 717,606, the reactivity of a sluggish triazine derivative with a particular dihydric alcohol is enhanced by the presence of a second, more reactive triazine derivative. The properties of the final aldehyde-reactable thermoplastic composition also may be varied by using a plurality of dihydric alcohols with a single triazine derivative or with a plurality of triazine derivatives; or by incorporating various modifying ingredients (e. g., a monohydric alcohol having a boiling point higher than the alcohol byproduct of the reaction) into the reaction mass before or during the transesterification reaction between the primary reactants.

Illustrative examples of dihydric alcohols that may be employed in preparing the aldehyde-reactable thermoplastic compositions, more particularly aldehyde-reactable linear polymers, used in practicing the present invention are:

Ethylene glycol
Diethylene glycol
Triethylene glycol
Tetraethylene glycol
Pentaethylene glycol
Hexaethylene glycol
Heptaethylene glycol
Octaethylene glycol
Nonaethylene glycol
Decaethylene glycol
1,3-butylene glycol
2-butyl-1,3-octanediol
2-ethyl-2-methylol-1-hexanol
6-methyl-2,4-heptanediol
Propylene glycol
Dipropylene glycol
Hexamethylene glycol
2-ethyl-1,3-hexanediol, etc.

Illustrative examples of triazine derivatives embraced by Formula I that may be used in preparing the aldehyde-reactable thermoplastic compositions are:

2-amino-4,6-diethoxy-1,3,5-triazine
2-octadecylamino-4,6-dimethoxy-1,3,5-triazine
2-dodecylamino-4,6-dimethoxy-1,3,5-triazine
2-butylamino-4,6-dimethoxy-1,3,5-triazine
2-amino-4,6-dibutoxy-1,3,5-triazine
2-anilino-4,6-dimethoxy-1,3,5-triazine
2-methylamino-4,6-dialloxy-1,3,5-triazine
2-allylamino-4,6-dimethoxy-1,3,5-triazine
2-amino-4,6-diphenoxy-1,3,5-triazine
2-amino-4,6-dibenzoxy-1,3,5-triazine
2-benzylamino-4,6-diethoxy-1,3,5-triazine
2-anilino-4,6-dipropoxy-1,3,5-triazine
2-amino-4-methoxy-6-ethoxy-1,3,5-triazine
2-cyclohexylamino-4,6-dialloxy-1,3,5-triazine
2-cyclohexenylamino-4,6-dicyclohexoxy-1,3,5-triazine
2 - methallylamino - 4 - alloxy - 6 - methalloxy-1,3,5-triazine Other examples are given in my aforementioned copending application Serial No. 717,606.

Illustrative examples of triazine derivatives embraced by Formula II that may be admixed with one or more triazine derivatives or the kind covered by Formula I and the resulting admixture then reacted with a dihydric alcohol or with a plurality of dihydric alcohols to yield an aldehyde-reactable thermoplastic composition are:

2 - (N - methyl - N - cyclohexylamino) - 4,6 - dimethoxy-1,3,5-triazine
2 - (N - ethyl - N - cyclohexylamino) - 4,6 - dimethoxy - 1,3,5-triazine
2-dimethylamino-4,6-dialloxy-1,3,5-triazine
2-diallylamino-4,6-dimethoxy-1,3,5-triazine
2-diethylamino-4,6-diphenoxy-1,3,5-triazine
2-dipropylamino-4,6-dibenzoxy-1,3,5-triazine
2-dibenzylamino-4,6-diethoxy-1,3,5-triazine
2-dianilino-4,6-dipropoxy-1,3,5-triazine
2-dibutylamino-4,6-dipentoxy-1,3,5-triazine
2-dioctylamino-4,6-dioctoxy-1,3,5-triazine
2-dicyclohexylamino-4,6-dimethoxy-1,3,5-triazine
2-didodecylamino-4,6-dialloxy-1,3,5-triazine
2-dioctadecylamino-4,6-dihexoxy-1,3,5-triazine
2-dinaphylamino-4,6-dimethoxy-1,3,5-triazine
2 - (N - ethyl - N - anilino) - 4,6 - dicyclohexoxy-1,3,5-triazine
2-dibutenylamino-4,6-dihexenoxy-1,3,5-triazine
2 - dimethylamino - 4 - methoxy - 6 - ethoxy-1,3,5-triazine
2 - diethylamino - 4 - propoxy - 6 - alloxy - 1,3,5-triazine
2-dianilino-4-ethoxy-6-phenoxy-1,3,5-triazine
2-ditolylamino-4,6-dialloxy-1,3,5-triazine
2 - diethylphenylamino - 4,6 - dibenzoxy - 1,3,5-triazine
2-dioleylamino-4,6-dimethalloxy-1,3,5-triazine
2 - (N - benzyl - N - allylamino) - 4,6 - dimethoxy-1,3,5-triazine
2 - (N - phenyl - N - methallylamino) - 4,6 - diethoxy-1,3,5-triazine The aldehyde-reactable thermoplastic compositions or linear polymers used in practicing the present invention vary from liquid products to resinous materials which are solid or semi-solid at room temperature. Reference is made to my aforementioned copending application Serial No. 717,606 for additional information, including numerous examples, relative to the preparation of these materials.

In practicing my invention the initial condensation reaction between the reactants may be carried out at normal or an elevated temperature, at atmospheric, subatmospheric or superatmospheric pressures, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di- or tri-amine, etc. Illustrative examples of acid condensation catalysts that may be employed are inorganic or organic acids such as hydrochloride, sulfuric, phosphoric, acetic, lactic, acrylic, phthalic, maleic, etc., or acid salts such as sodium acid sulfate, monosodium phosphate, monosodium phthalate, etc. Mixtures of acids, of acid salts or of acids and of acid salts may be employed if desired. Since the aldehyde-reactable linear polymeric reactant is itself alkaline as initially produced (due to the presence therein of the alkali metal or alkali-metal alcoholate used as a catalyst in its preparation), no additional alkaline substance ordinarily need be employed when it is desired to effect the reaction between the aldehyde and the linear polymer under alkaline conditions.

The reaction between the aldehyde, e. g., formaldehyde, and the linear polymer may be carried out in the presence of solvents or diluents, other natural or synthetic bodies (numerous examples of which hereafter are given), or while admixed with other materials which are reactable or non-reactable with the aldehydic reactant or with the linear polymer, e. g., urea, thiourea, cyanamide, dicyandiamide, phthalic diamide, acetamide, chlorinated acetamides, methyl ethyl ketone, etc.; aldehyde-reactable triazinyl compounds other than the linear polymers used in practicing the present invention, e. g., melamine, ammeline, amelide, etc.; phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, etc.; amines, including aromatic amines, e. g., aniline, etc.; and the like.

The modifing reactants may be incorporated with the linear polymer and the aldehyde to form an intercondensation product by mixing all the reactants and effecting condensation therebetween under acid, alkaline or neutral conditions or by various permutations of reactants. For example, I may effect partial reaction or condensation between the chosen aldehyde and the linear polymer, then add the modifying reactant, e. g., urea, melamine, etc., and effect further condensation. Or, I may first partially react urea, melamine or other aldehyde-reactable modifying reactant with a molecular excess of an aldehyde under acid, alkaline or neutral conditions, then add the linear polymer and effect further condensation. Or, I may separately partially react (1) urea, melamine or other aldehyde-reactable modifying reactant and an aldehyde and (2) a linear polymer of the kind above described and an aldehyde, thereafter mixing the two products of partial reaction and effecting further reaction or condensation therebetween. The reactants of (1) and (2) initially may be partially condensed under acid, alkaline or neutral conditions.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea and iminourea, and of substituted ureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Good results are obtained with aldehyde-addition products such as a methylol urea, more particularly mono- and di-methylol ureas, and a methylol melamine, e. g., monomethylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the linear polymer may be varied over a wide range depending, for example, upon the number of aldehyde-reactable amino groups in the linear polymer and upon the particular properties desired in the finished product. The aldehyde, e. g., formaldehyde, is used in an amount sufficient to react with from one to all of the reactive amino groups in the linear polymer. Ordinarily these reactants are employed in an amount corresponding to at least 1 mol of the aldehyde, specifically formaldehyde, for each mol of the linear polymer. I may use, for instance, from 0.1 to 2 mols of the aldehyde, e. g., formaldehyde, for each aldehyde-reactable recurring unit in the linear polymer. When the aldehyde is available for reaction in the form of an alkylol derivative, more particularly a methylol derivative, e. g., dimethylol urea, trimethylol melamine, etc., amounts of such alkylol derivatives corresponding to or higher (e. g., from a few per cent more to 15 or 20 times as much) than the relative amounts mentioned above with reference to the aldehyde may be used.

In order that those skilled in the art better may understand how the present invention may be carried into effect the following examples are given by way of illustration and not by way of limitation. All parts are by weight.

EXAMPLE 1

*a*

A linear polymer was prepared as follows:

|  | Parts | Approx. Mol Ratio |
|---|---|---|
| 2-Amino-4,6-diethoxy-1,3,5-triazine | 1,028 | 1 |
| Diethylene glycol | 525 | 1 |
| Sodium | 12 |  |

The sodium was dissolved in the diethylene glycol, the triazine derivative added thereto, and the resulting mixture then heated under reduced pressure at a temperature ranging from 90° to 150° C. for 2½ hours. For 1 hour and 50 minutes of this time the reaction mass was at a temperature of 140° to 150° C. During the reaction period 78% of the theoretical amount of ethanol was collected. The product was a clear, amber-colored, brittle, thermoplastic resin which was somewhat tacky.

*b*

|  | Parts |
|---|---|
| Linear polymer of "A" | 300 |
| Aqueous formaldehyde (approx. 37% HCHO) | 469 |

The above ingredients were heated together under reflux at the boiling temperature of the mass for 30 minutes, yielding a clear, water-white, resinous syrup. In the above formula the ratio of the formaldehyde to the linear polymer was approximately 3.87 mols of the former for each recurring unit in the polymer. The reaction mass was alkaline during the condensation reaction due to the alkalinity of the polymer of "A."

A portion of this syrup was acidified with a small amount of phosphoric acid and evaporated at 80° C. over a period of 2 hours, resulting in a cloudy gel. Further heating for 3 hours at 150° C. gave a clear, amber-colored resin which was somewhat tacky at 150° C. but hard and slightly flexible at room temperature.

Another portion of the above syrup was heated to remove a large portion of the water and any unreacted formaldehyde. The hot, syrupy residue was mixed with 2% of maleic anhydride (as a catalyst), based on the resin content of the syrup. This is enough catalyst to make the syrup only slightly acidic. The syrup was heated for 1 hour at 120° C. and then for 1½ hours at 150° C. whereby a tough, rubbery, resinous material (as observed at 150° C.) was obtained. On cooling, this resin was clear, white and extremely hard and tough.

Similar results are obtained when a linear polymer produced by reaction of 2-amino-4,6-dimethoxy-1,3,5-triazine and diethylene glycol or triethylene glycol are substituted for the linear polymer of "A" of this example in a reaction with formaldehyde.

EXAMPLE 2

|   | Parts |
|---|---|
| Linear polymer of "A" of Example 1 | 80 |
| Aqueous formaldehyde (approx. 37% HCHO) | 85 |

The above ingredients were heated together as described under Example 1. The resulting resinous syrup could be diluted with an infinite volume of water. Such aqueous (alkaline) solutions did not gel or become cloudy upon standing at room temperature. These solutions, after acidification or incorporation of a latent curing catalyst therein, are especially suitable for use as impregnating and laminating compositions, for example in impregnating sheets of paper, cloth, asbestos, rayon, nylon, etc., which thereafter are dried, superimposed and laminated together under heat and pressure. The pH of such solutions may be adjusted as desired or as conditions may require in order to obtain a composition of the desired curing rate.

Cross-linked, insoluble and infusible resins may be precipitated from such solutions (diluted, for example, to about 20% resin solids) by acidifying the solution with an acid, e. g., sulfuric acid, to a pH of about 1.0 and heating the acidified solution at a temperature of about 100° C.

EXAMPLE 3

|   | Parts |
|---|---|
| Linear polymer of "A" of Example 1 | 30.0 |
| Paraldehyde (paracetaldehyde) | 19.9 |
| Phosphoric acid (85%) | 3.7 |

A mixture of the above ingredients was boiled gently. A homogeneous resinous syrup gradually was formed. On further heating unreacted paraldehyde was expelled and the mass gradually became more viscous until a brittle, infusible, solid, resinous material was obtained. Very little discoloration occurred during this conversion of the thermoplastic resin to an infusible state.

EXAMPLE 4

|   | Parts |
|---|---|
| Linear polymer of "A" of Example 1 | 28 |
| Chloral hydrate | 20 |
| Water | 50 |

The mixture of the above ingredients, which mixture was alkaline due to the alkalinity of the linear polymer, was boiled until a nearly clear, opalescent, resinous syrup was obtained. Then approximately 11 parts of 3 N phosphoric acid was added, and the mixture again was boiled until it was quite viscous. A portion of the viscous syrup was poured on a glass plate, and the coated plate was baked for 3 hours at 150° C. The baked film was clear and hard. No darkening occurred during the baking of the resin. This shows the color permanence of the resin under heat.

In the above formula the ratio of the choral hydrate to the linear polymer was approximately 1 mol of the former for each recurring unit in the polymer.

EXAMPLE 5

|   | Parts |
|---|---|
| Linear polymer of "A" of Example 1 | 23 |
| Furfural | 16 |

A mixture of the above ingredients, which mixture was alkaline due to the alkalinity of the linear polymer, was boiled gently for 3 or 4 minutes, yielding a dark red, resinous syrup, which was heated further for 15 minutes at 150° C. To the resulting resinous mass was added 2 parts maleic anhydride as a curing catalyst. A portion of the catalyzed syrup was poured on a glass plate and the coated plate was baked for 2 hours at 150° C. During this curing operation the resin became progressively less rubbery and finally was converted to a black, hard, brittle resin which was slightly soft at 150° C.

In the above formula the ratio of the furfural to the linear polymer was approximately 1.45 mols of the former for each recurring unit in the polymer.

EXAMPLE 6

|   | Parts |
|---|---|
| Linear polymer of "A" of Example I | 12 |
| Crotonaldehyde | 43 |
| Maleic anhydride | 2 |

A mixture of the above ingredients was boiled until a very viscous, orange-colored syrup was obtained. This viscous syrup was heated for 2 hours at 150° C. to yield a resinous material which was tough and rubbery at 150° C. but hard and brittle at room temperature.

EXAMPLE 7

A linear polymer of 2-amino-4,6-dimethoxy-1,3,5-triazine and diethylene glycol was prepared as described under Example 21 of my aforementioned copending application Serial No. 717,606. A mixture of 230 parts of this resin and 230 parts of aqueous formaldehyde containing approximately 37% HCHO was heated for 1 hour at approximately 85° C. to yield a thermosetting resin which was convertible upon further heating at around 150° C. to a substantially insoluble, substantially infusible state.

EXAMPLE 8

A linear polymer of 2-amino-4,6-dibutoxy-1,3,5-triazine and decamethylene glycol was prepared as described under Example 25 (first example of the table) of my copending application Serial No. 717,606.

|   | Parts |
|---|---|
| Linear polymer of 2-amino-4,6-dibutoxy-1,3,5-triazine and decamethylene glycol | 100.0 |
| Aqueous formaldehyde (approx. 37.1% HCHO) | 66.1 |
| n-Butanol | 40.5 |

The mixture of the above ingredients, which mixture was alkaline due to the alkalinity of the linear polymer, was heated at 75° C. under reduced pressure, and while an equal volume of butanol (n-butanol) was added gradually to the reaction mass, about 500 parts of distillate was obtained. The alcohol-modified reaction product initially was cloudy but was clear after standing for about 64 hours at room temperature. A sample of this coating composition was applied to a tin plate and cured by heating for 1 hour at 100° C., yielding a film that was somewhat soft. A harder film was obtained by similarly curing on a tin plate a sample of the coating composition into which had been incorporated 1% of phosphoric acid, based on the weight of the resin, as a curing catalyst.

In the above formula the ratio of the formaldehyde (HCHO) to the linear polymer was approximately 2 mols of the former for each recurring unit in the polymer.

EXAMPLE 9

To 300 parts of triethylene glycol was added 4 parts of metallic sodium, and the mixture was warmed to dissolve the sodium. Three hundred and twelve (312) parts of 2-amino-4,6-dimethoxy-1,3,5-triazine was next added, after which the resulting mixture was stirred and heated for 5 hours at a temperature of 90° to 153° C. under a pressure ranging from 37 mm. down to 1 mm. For most of this time (2¾ hours) the reaction mass was at a temperature of 145° to 153° C. A yield of 502 parts of thermoplastic linear polymer was obtained.

| | Parts |
|---|---|
| Linear polymer of 2-amino-4,6-dimethoxy-1,3,5-triazine and triethylene glycol | 25.1 |
| Melamine | 113.4 |
| Butanol (n-butanol) | 440.0 |
| Aqueous formaldehyde (approx. 37% HCHO) | 381.0 |
| Phosphoric acid (dissolved in about 8 parts of butanol) | 0.9 |

The above linear polymer and the butanol solution of phosphoric acid were added to the aqueous formaldehyde solution, and the resulting mixture was heated to 85° C. to give a clear solution. To this solution were then added the above-stated amounts of butanol and melamine. The resulting mixture was heated at a temperature of 89° to 100° C. over a period of 5½ hours, the volume of the reaction mass being kept constant by adding more butanol to replace the volatile matter removed by distillation. During the last hour of the heating period the reaction was continued under reduced pressure, without adding more butanol, and the reaction mass was reduced by distilling off volatile matter until the solution contained approximately 77.7% of resin solids as determined by heating a sample for 2 hours at 105° C. and noting the loss in weight.

The product of this example is suitable for use in surface-coating compositions. When diluted with a mixture of equal parts of xylene and butanol to yield a liquid composition containing approximately 50% resin solids, a colorless solution is obtained having a Gardner-Holdt viscosity of I and infinite tolerance for mineral spirits. It is somewhat more compatible with long oil varnishes of the oil-modified alkyd type than similar butanol-modified melamine-formaldehyde compositions into which no linear polymer of the kind aforementioned has been intercondensed.

A white baking enamel was made from a mixture of a solution in mineral spirits of an oil-modified alkyd resin and the above xylene-butanol resin solution of this example in the ratio of 3 parts of the former to 1 of the latter based on the amount of resin solids present in each. Titanium dioxide was incorporated into the enamel so that it had a 1:1 pigment to vehicle ratio. The enamel was thinned with mineral spirits to yield a composition containing approximately 55.5 percent of non-volatile matter and having a viscosity (No. 4 Ford cup) of 27 seconds. The enamel was sprayed on unprimed cold rolled steel and baked for 60 minutes at 250° F. The baked coating had better color and gloss and was more resistant to attack by a 50% solution of acetic acid when immersed therein for 10 minutes than a similar enamel containing a butanol-modified melamine-formaldehyde resin which had none of the aforementioned linear polymer intercondensed therein.

EXAMPLE 10

A linear polymer was prepared by heating a mixture of 184 parts of 2-amino-4,6-diethoxy-1,3,5-triazine and 106 parts of diethylene glycol, having dissolved therein 2 parts of metallic sodium, for about 5 hours at 100° to 153° C. under reduced pressure.

| | Parts |
|---|---|
| Linear polymer of 2-amino-4,6-diethoxy-1,3,5-triazine and diethylene glycol | 195.0 |
| Aqueous formaldehyde (approx. 37% HCHO) | 146.0 |
| n-Butanol | 390.0 |
| Phosphoric acid (dissolved in about 57 parts of butanol) | 7.8 |

A mixture of 390 parts of butanol and 195 parts of the above linear polymer was brought to reflux temperature over a period of about 30 minutes. The phosphoric acid (7.8 parts) dissolved in about 57 parts of butanol was then added, followed by the addition of 146 parts of 37% aqueous formaldehyde. A clear solution was obtained after heating for an additional 5 minutes. Heating was continued at atmospheric pressure for 1 hour and 50 minutes at 92° to 100° C., additional butanol being added from time to time to replace the volatile matter removed by distillation. The reaction was then continued under vacuum for about 55 minutes at 95°-96° C., during which time no more butanol was added. At the end of the reaction period 50 parts of xylene was added, yielding a liquid composition containing about 54.3% resin solids. Additional xylene was added to reduce the resin content to 50%. The resulting composition (about 550 parts) was mixed with 100 parts of another composition similarly made from a linear polymer of 2-amino-4,6-diethoxy-1,3,5-triazine and diethylene glycol. The filtered solution was water-white and had a Gardner-Holdt viscosity of V.

Part of the resin solution was thinned with xylene to a No. 4 Ford cup viscosity of 26 seconds, at which viscosity it contained about 36.4% of non-volatile matter, and was then applied to steel, tin and aluminum panels. When cured at temperatures of the order of 350° to 400° F. the baked films on all the metals showed excellent toughness, adhesion and flexibility. The wetting of all the metals with the resin coating also was satisfactory. When an enamel was made by mixing the resin solution with titanium dioxide in a 1:1 ratio of titanium dioxide to vehicle it yielded films which, when baked at 350° F., were superior in color, resistance to discoloration, alkali resistance, permanence of gloss and non-embrittlement at 350° F. as compared with conventional enamels made from mixtures of an oil-modified alkyd resin and a butanol-modified melamine-formaldehyde resin, and at least as good in flexibility and adhesion as such conventional enamels. The enamels of this example therefore may be used advantageously as surface-protective coatings on, for example, washing machines and, in clear state, for coating cans.

EXAMPLE 11

A linear polymer was prepared from 2-amino-4,6-diethoxy-1,3,5-triazine and decamethylene glycol as described under Example 12 of my aforementioned copending application Serial No. 717,606.

| | Parts |
|---|---|
| Linear polymer of 2-amino-4,6-diethoxy-1,3,5-triazine and decamethylene glycol | 57.6 |
| Aqueous formaldehyde (approx. 37% HCHO) | 32.4 |
| n-Butanol | 116.0 |
| Phosphoric acid (dissolved in about 6.5 parts butanol) | 0.9 |

The mixture of 57.6 parts of the above linear polymer and 116 parts of butanol was heated at atmospheric pressure for 14 minutes, after which the phosphoric acid-butanol solution was added thereto. After heating for an additional 12 minutes, the aqueous formaldehyde was added. The mass was heated for about 53 minutes more, during which time additional butanol was added to replace the volatile matter which distilled off. Distillation was continued under vacuum until a product of the desired viscosity was obtained. A sample of the resinous composition was diluted with xylene and applied to a tin panel. The coated panel was baked for 30 minutes at 150° C., yielding a cured resinous film which was tough and flexible at room temperature, and which showed very little change in properties upon baking for another 30 minutes at the same temperature.

EXAMPLE 12

A linear polymer was prepared from 2-amino-4,6-diethoxy-1,3,5-triazine and hexamethylene glycol as described under Example 11 of my aforementioned copending application Serial No. 717,606.

| | Parts |
|---|---|
| Linear polymer of 2-amino-4,6-diethoxy-1,3,5-triazine and hexamethylene glycol | 305.5 |
| Aqueous formaldehyde (approx. 37% HCHO) | 227.0 |
| Butanol | 305.5 |
| Phosphoric acid (dissolved in about 42 parts butanol) | 9.0 |

A mixture of the above linear polymer and phosphoric acid-butanol solution was brought to reflux temperature in about 25 minutes. After further heating for 7 minutes the butanol (305.5 parts) was added over a period of 16 minutes, followed by the addition of the formaldehyde during a period of 6 minutes. After heating at atmospheric pressure for another 2 hours at about 92° C., additional butanol was added from time to time thereafter over a period of about 1¾ hours (in order to replace the volatile matter which distilled off), during which time the reaction mass was heated at about 93° to 101° C. After clarifying the resulting solution by mixing with diatomaceous earth and centrifuging, it was further heated under reduced pressure at about 88° to 91° C. for about 40 minutes, yielding a liquid composition containing about 60.8% resin solids as determined by heating a sample for 2 hours at 105° C. This composition was thinned with butanol to 60% resin solids.

A white enamel was made from the above composition using titanium dioxide as a pigment in an amount corresponding to 1 part thereof for each 0.9 part resin solids in the liquid resinous composition. After being thinned with a mixture of butanol and xylene to yield an enamel having a No. 4 Ford cup viscosity of 29 seconds, a sample thereof was sprayed on automotive cold rolled steel and baked for 10 minutes at 350° F. The color and color retention at 350° F. was somewhat superior, and the alkali resistance far superior, to an enamel similarly made from a mixture of 1 part butanol-modified melamine-formaldehyde resin and 2 parts of an oil-modified alkyd resin.

The addition of a small amount, e. g., about 1% by weight thereof, of a catalyst, e. g., dimethyl acid pyrophosphate, accelerates the curing at an elevated temperature, e. g., at 250° to 350° F., of the clear coating composition of this example.

It will be understood, of course, by those skilled in the art that my invention is not limited to the specific reactants nor to the specific conditions of reaction shown in the above illustrative examples. For instance, the reaction may be effected at temperatures ranging from room temperature (more particularly in the case of those linear polymers which are liquids at room temperature) to the fusion or boiling temperature of the mixed reactants, the reaction proceeding more slowly at normal temperatures than at elevated temperatures in accordance with the general law of chemical reactions. Instead of formaldehyde, paraldehyde, chloral hydrate, furfural or crotonaldehyde shown in the individual examples as the aldehydic reactant, any other aldehyde or compound engendering an aldehyde, numerous examples of which have been given hereinbefore, may be employed. Also, instead of the particular linear polymers used in the various examples, I may employ any other linear polymer of the kind described in the first paragraph of this specification and which may be prepared from, for instance, any of the dihydric alcohols and any of the triazine derivatives of the kind embraced by Formula I (or mixtures thereof with any of the triazine derivatives of the kind covered by Formula II), of which numerous specific examples hereinbefore have been given. Thus I may use, for example, as a reactant with an aldehyde, e. g., formaldehyde, a linear polymer prepared by reacting diethylene glycol and 2-butylamino-4,6-dimethoxy-1,3,5-triazine, triethylene glycol and 2-amino-4,6-dialloxy-1,3,5-triazine, hexamethylene glycol and a mixture of equal molar amounts of 2-amino-4,6-dimethoxy-1,3,5-triazine and 2 - cyclohexylamino - 4,6-diethoxy-1,3,5-triazine, etc.

If the linear polymer as initially prepared has been neutralized prior to its reaction with an aldehyde, it may be reacted with the aldehyde under neutral conditions, under acid conditions or under alkaline conditions, e. g., in the presence of a small amount of sodium or potassium hydroxide, sodium or potassium carbonate, barium hydroxide, an amine (e. g., mono-, di- or tri-methylamine, mono-, di- or tri-ethylamine, mono-, di- or tri-butylamine, mono-, di- or tri-ethanolamine, etc.), a quaternary ammonium compound, etc.

The curing of the thermosetting or potentially thermosetting resinous compositions of this invention may be accelerated by incorporating therein a curing agent (or a mixture of curing agents), for instance a direct or active curing catalyst (e. g., phthalic acid, phthalic anhydride, maleic acid, maleic anhydride, succinic acid, tartaric acid, citric acid, etc.), or a latent curing catalyst (e. g., an ammonium salt of phosphoric acid, ammonium silicofluoride, ammonium borofluoride, benzoyl mercaptobenzothiazole, phthaloyl mercaptobenzothiazole, benzoyl phthalimide, etc.). Catalysts which are capable of intercondensing with the partial reaction product may be employed, for instance curing reactants such as glycine, sulfamic acid, chloroacetone, chloroacetyl urea, etc. The amount of curing catalyst, if used, may be varied as desired or as conditions may require, but ordinarily is within the range of 0.1 to 5 or 6 per cent by weight of the neutral thermosetting or potentially thermosetting resinous composition.

As indicated hereinbefore and as further shown by a number of the examples the properties of the fundamental resins of this invention may be varied widely by introducing other modifying bodies before, during or after effecting condensation between the primary components. Thus, as modifying agents I may use, for instance, monohydric alcohols, e. g., methyl, ethyl, propyl, isopropyl, butyl, hexyl, n-octyl, 2-ethylhexyl, decyl, dodecyl, cetyl, lauryl, capryl or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol or any of the other dihydric alcohols hereinbefore mentioned, etc.; alcohol-ethers, e. g., ethylene glycol monomethyl ether, ethylene glycol monoethyl ether, ethylene glycol monobutyl ether, diethylene glycol monomethyl ether, diethylene glycol monethyl ether, diethylene glycol monobutyl ether, etc.; amides, e. g., cyanamide, dicyandiamide, stearamide, acrylamide, benzamide, phthalamide, benzene sulfonamides, toluene sulfonamides, etc.; amines, e. g., ethylene diamine, phenylene diamine, triethylene tetramine, etc.; ketones, including halogenated ketones, e. g., methyl ethyl ketone, acetone, chloroacetones, etc.; nitriles, including halogenated nitriles, e. g., acrylonitrile, methacrylonitrile, acetonitrile, chloroacetonitriles, etc.; acylated ureas, including halogenated acylated ureas, e g., acetyl urea, propionyl urea, chloroacetylureas, etc.

Illustrative examples of other modifying bodies that may be incorporated into the resinous compositions of this invention are melamine-aldehyde condensation products (e. g., melamine-formaldehyde condensation products), urea-aldehyde condensation products (e. g., urea - formaldehyde condensation products), urea-malamine-aldehyde condensation products (e. g., urea-malamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.) polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

Dyes, pigments, driers, curing agents, plasticizers, mold lubricants, opacifiers and various fillers (e. g., wood flour, glass fibers, asbestos, mineral wool, mica dust, powdered quartz, titanium dioxide, zinc oxide, talc, China clay, carbon black, etc.) may be compounded by conventional practice with the resinous materials of my invention, as desired or as conditions may require, in order to provide a coating, molding or other composition best adapted to meet a particular service use. For additional and more detailed information concerning the modifying ingredients that may be employed in producing coating compositions from my new resins, reference is made to the aforementioned Moore patent.

The modified and unmodified resinous compositions of this invention have a wide variety of uses. For example, in addition to their use in the production of coating and molding compositions, they may be employed as modifiers of other natural and synthetic resins. Thus, they may be used to improve the plasticity or flow characteristics of thermosetting resins which have insufficient or unsatisfactory plasticity during curing to an insoluble, infusible state, e. g., certain urea-formaldehyde resins where better flow during molding, without decreasing the curing time, is desirable. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also may be used for treating textile materials (e. g., cotton, linen, rayon and other cellulose-containing textiles, wool, silk and other natural or synthetic proteinaceous textiles, including nylon and textiles derived from casein, soyabeans, etc.), in filament, thread, yarn, fabric (woven or felted) or other form, in order to improve the properties of such textile materials, e. g., to increase the stiffness, to increase the service life, or otherwise to enhance the properties of the treated materials and to make them more useful or serviceable to the ultimate user. They also may be employed for treating leather in order to improve its appearance and physical properties.

What I claim as new and desire to secure by Letters Patent of the United States is:

1. A composition comprising a resinous material obtained by effecting reaction between ingredients including (1) an aldehyde and (2) a thermoplastic composition resulting from a transesterification reaction between ingredients including (a) at least one triazine derivative represented by the general formula

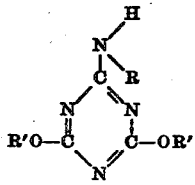

where R represents a member of the class consisting of hydrogen and monovalent hydrocarbon radicals and R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

2. A composition comprising a resinous material obtained by effecting reaction between ingredients including (1) an aldehyde and (2) a thermoplastic composition resulting from a transesterification reaction between (a) a plurality of triazine derivatives one of which is represented by the general formula

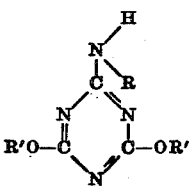

where R represents a member of the class consisting of hydrogen and monovalent hydrocarbon radicals and R' represents a monovalent hydrocarbon radical, and another of which is represented by the general formula

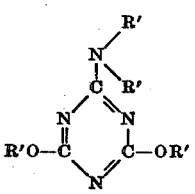

where R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

3. A composition as in claim 1 wherein the aldehyde of (1) is formaldehyde.

4. A composition as in claim 1 wherein R represents hydrogen.

5. A composition as in claim 1 wherein R represents hydrogen and R' represents an alkyl radical.

6. A heat-curable resinous composition comprising a heat-convertible product obtained by effecting partial reaction between ingredients comprising (1) formaldehyde and (2) a linear polymer resulting from a transesterification reaction between ingredients including (a) at least one triazine derivative represented by the general formula

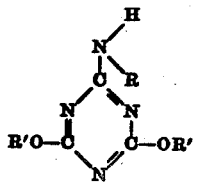

where R represents a member of the class consisting of hydrogen and monovalent hydrocarbon radicals and R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

7. A product comprising the cured resinous composition of claim 6.

8. A composition comprising a resinous material obtained by effecting reaction between ingredients including (1) an aldehyde, (2) an alcohol and (3) a linear polymer resulting from a transesterification reaction between ingredients including (a) at least one triazine derivative represented by the general formula

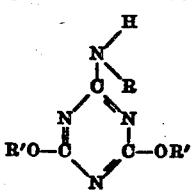

where R represents a member of the class consisting of hydrogen and monovalent hydrocarbon radicals and R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

9. A coating composition comprising a resinous material obtained by effecting reaction between ingredients including (1) formaldehyde, (2) a monohydric alcohol and (3) a linear polymer resulting from a transesterification reaction between ingredients including (a) at least one triazine derivative represented by the general formula

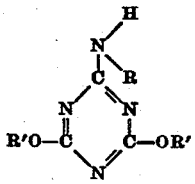

where R represents a member of the class consisting of hydrogen and monovalent hydrocarbon radicals and R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

10. A composition comprising a resinous material obtained by effecting reaction between ingredients including (1) an aldehyde, (2) melamine and (3) a linear polymer resulting from a transesterification reaction between ingredients including (a) at least one triazine derivative represented by the general formula

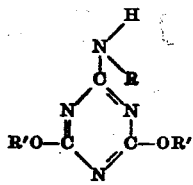

where R represents a member of the class consisting of hydrogen and monovalent hydrocarbon radicals and R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

11. A composition comprising the resinous product of reaction of ingredients comprising (1) an aldehyde and (2) a linear polymer resulting from a transesterification reaction between ingredients including a 2-amino-4,6-dialkoxy-1,3,5-triazine and a hydrocarbon dihydric alcohol in which the hydroxy groups are primary.

12. A resinous composition comprising the product of reaction of ingredients comprising (1) formaldehyde and (2) a linear polymer resulting from a transesterification reaction between ingredients including a 2-amino-4,6-dialkoxy-1,3,5-triazine and a hydrocarbon dihydric alcohol in which the hydroxy groups are primary.

13. A composition comprising the resinous product of reaction of ingredients comprising (1) an aldehyde and (2) a linear polymer resulting from a transesterification reaction between ingredients including 2-amino-4,6-dimethoxy-1,3,5-triazine and a dihydric alcohol in which the hydroxy groups are primary, said dihydric alcohol having an oxygen atom of a linear ether in a hydrocarbon chain and being free from epoxy groups.

14. A composition comprising the resinous product of reaction of ingredients comprising (1) an aldehyde and (2) a linear polymer resulting from a transesterification reaction between ingredients including 2-amino-4,6-diethoxy-1,3,5-triazine and a hydrocarbon dihydric alcohol in which the hydroxy groups are primary.

15. A resinous composition comprising the product of reaction of ingredients comprising (1) formaldehyde and (2) a linear polymer resulting from a transesterification reaction between 2-amino-4,6-dimethoxy-1,3,5-triazine and diethylene glycol.

16. A resinous composition comprising the product of reaction of ingredients comprising (1) formaldehyde and (2) a linear polymer resulting from a transesterification reaction between 2-amino-4,6-dimethoxy-1,3,5-triazine and triethylene glycol.

17. A resinous composition comprising the product of reaction of ingredients comprising (1) formaldehyde and (2) a linear polymer resulting from a transesterification reaction between 2-amino-4,6-diethoxy-1,3,5-triazine and hexamethylene glycol.

18. A coating composition comprising the product of reaction of ingredients comprising (1) formaldehyde, (2) n-butanol and (3) a linear polymer resulting from a transesterification reaction between 2-amino-4,6-diethoxy-1,3,5-triazine and hexamethylene glycol.

19. A method of preparing new resinous materials which comprises effecting reaction between ingredients including (1) an aldehyde and (2) a linear polymer resulting from a transesterification reaction between ingredients including (a) at least one triazine derivative represented by the general formula

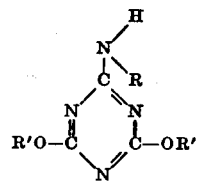

where R represents a member of the class consisting of hydrogen and monovalent hydrocarbon radicals and R' represents a monovalent hydrocarbon radical and (b) a dihydric alcohol in which the hydroxy groups are members of the class consisting of primary and secondary hydroxy groups, and further characterized by being a member of the class consisting of hydrocarbon dihydric alcohols and dihydric alcohols having an oxygen atom of a linear ether in a hydrocarbon chain and which are free from epoxy groups.

20. A composition comprising the resinous product of reaction of ingredients comprising (1) an aldehyde and (2) a linear polymer resulting from a transesterification reaction between ingredients including a 2-amino-4,6-dialkoxy-1,3,5-triazine and a dihydric alcohol in which the hydroxy groups are primary, said dihydric alcohol having an oxygen atom of a linear ether in a hydrocarbon chain and being free from epoxy groups.

21. A resinous composition comprising the product of reaction of ingredients comprising (1) formaldehyde and (2) a linear polymer resulting from a transesterification reaction between ingredients including a 2-amino-4,6-dialkoxy-1,3,5-triazine and a dihydric alcohol in which the hydroxy groups are primary, said dihydric alcohol having an oxygen atom of a linear ether in a hydrocarbon chain and being free from epoxy groups.

FREDERIC C. SCHAEFER.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,381,121 | Ericks | Aug. 7, 1945 |

FOREIGN PATENTS

| Number | Country | Date |
|---|---|---|
| 114,481 | Sweden | July 10, 1945 |

Certificate of Correction

Patent No. 2,481,155 September 6, 1949

FREDERIC C. SCHAEFER

It is hereby certified that errors appear in the printed specification of the above numbered patent requiring correction as follows:

Column 2, line 10, after the word "phenyl" insert a comma; line 18, for "presnt" read *present*; column 6, line 52, for "hydrochloride" read *hydrochloric*; column 7, line 12, for "modifing" read *modifying*; column 15, line 32, for "monethyl" read *monoethyl*; lines 53 and 54, for "malamine" read *melamine*, each occurrence;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*